US012794284B2

(12) United States Patent
Balista et al.

(10) Patent No.: US 12,794,284 B2

(45) Date of Patent: Nov. 10, 2026

(54) SUPPORT STRUCTURES USED DURING TRANSPORTATION OF A SHAFT-LESS ROTATING ELECTRICAL MACHINE

(71) Applicant: GE ENERGY POWER CONVERSION TECHNOLOGY LIMITED, Rugby (GB)

(72) Inventors: Alex Balista, Rugby (GB); Andrew Clarke, Rugby (GB); Vipulkumar Patel, Rugby (GB); Suresh Nar, Rugby (GB)

(73) Assignee: GE ENERGY POWER CONVERSION TECHNOLOGY LIMITED, Rugby (GB)

( * ) Notice: Subject to any disclaimer, the term of this patent is extended or adjusted under 35 U.S.C. 154(b) by 204 days.

(21) Appl. No.: 18/650,943

(22) Filed: Apr. 30, 2024

(65) Prior Publication Data

US 2024/0413675 A1 Dec. 12, 2024

(30) Foreign Application Priority Data

Jun. 9, 2023 (EP) .................................... 23178326

(51) Int. Cl.
*H02K 1/18* (2006.01)
*H02K 1/28* (2006.01)

(52) U.S. Cl.
CPC ................ *H02K 1/18* (2013.01); *H02K 1/28* (2013.01)

(58) Field of Classification Search
CPC H02K 1/18; H02K 1/28; H02K 15/00; H02K 21/14; H02K 2213/09; H02K 15/16; H02K 7/1823; H02K 15/03; H02K 1/30; H02K 1/278; B65D 25/10; B65D 25/24; B65D 81/05; B65D 85/30; B65D 85/68
See application file for complete search history.

(56) References Cited

U.S. PATENT DOCUMENTS

2022/0286004 A1 9/2022 Watanabe et al.
2023/0163668 A1* 5/2023 Vartiainen ................ H02K 7/04 310/91

FOREIGN PATENT DOCUMENTS

| | | |
|---|---|---|
| CN | 205330891 U | 6/2016 |
| CN | 107968536 A | 1/2018 |
| CN | 207691645 U | 8/2018 |
| CN | 214835555 U | 11/2021 |
| CN | 214945131 U | 11/2021 |
| CN | 113740414 A | 12/2021 |
| CN | 113824288 A | 12/2021 |

(Continued)

OTHER PUBLICATIONS

Extended European Search Report for EP Application No. EP23178326.7 dated Nov. 16, 2023, 17 pages.

*Primary Examiner* — Joseph Ortega
(74) *Attorney, Agent, or Firm* — WOOD IP LLC

(57) ABSTRACT

Provided is a shaft-less rotating electrical machine that includes a stator supported by a stator frame and a rotor that is mechanically connectable to a shaftline and is positioned radially inside the stator. The electrical machine is prepared for transport and includes a support structure for stably supporting the rotor inside the stator frame and the support structure includes one or more supports that are positioned in the air gap between the stator and the rotor, and one or more transport brackets. The transport brackets are fixedly connected between the stator frame and the rotor.

15 Claims, 10 Drawing Sheets

(56) References Cited

FOREIGN PATENT DOCUMENTS

| | | | |
|---|---|---|---|
| CN | 113852226 | A | 12/2021 |
| CN | 215120328 | U | 12/2021 |
| CN | 215268017 | U | 12/2021 |
| CN | 215375225 | U | 12/2021 |
| CN | 113972853 | A | 1/2022 |
| CN | 114530973 | A | 5/2022 |
| CN | 114552831 | A | 5/2022 |
| CN | 216467314 | U | 5/2022 |
| CN | 216638760 | U | 5/2022 |
| CN | 114575995 | A | 6/2022 |
| CN | 114598204 | A | 6/2022 |
| CN | 114620586 | A | 6/2022 |
| DE | 102004058349 | B3 | 8/2006 |
| EP | 1895641 | A2 | 3/2008 |
| EP | 2333325 | A1 | 6/2011 |
| EP | 2232060 | B1 | 8/2011 |
| EP | 2437380 | A1 | 4/2012 |
| EP | 2896824 | A1 | 7/2015 |
| EP | 4184767 | A1 | 5/2023 |
| WO | 2009140954 | A2 | 11/2009 |
| WO | 2018139936 | A1 | 8/2018 |

* cited by examiner

SUPPORT STRUCTURES USED DURING TRANSPORTATION OF A SHAFT-LESS ROTATING ELECTRICAL MACHINE

CROSS-REFERENCE TO RELATED APPLICATIONS

This application claims priority to European Patent Application Serial Number EP23178326.7, filed Jun. 9, 2023, which is herein incorporated by reference.

TECHNICAL FIELD

The present invention relates to support structures used during transportation of a rotating electrical machine, and in particular when transporting a shaft-less rotating electrical machine.

The present invention also relates to a shaft-less rotating electrical machine comprising the support structure.

BACKGROUND OF INVENTION

Rotating electrical machines (e.g., motors and generators) are typically supplied to customers with a rotor shaft. The assembled electrical motor has a stator that is supported by a stator frame and a rotor that is mechanically fixed to the rotor shaft. The electrical machine may be transported to the customer in a suitable package (e.g., a container or crate) with the rotor shaft locked in position so that the rotor is secured inside the surrounding stator. In particular, the rotor shaft may be secured to the stator frame by a rigid beam or bracket. Locking or securing the rotor shaft to the stator frame prevents any radial or axial movement of the rotor relative to the stator during transportation of the electrical machine.

Rotating electrical machines for power take-off/power take-in (PTO/PTI) applications are normally supplied to the customer without a rotor shaft. Such shaft-less rotating electrical machines are designed to be inserted into an existing shaftline, e.g., the propulsion shaft of a marine vessel. The propulsion shaft may be driven by a main engine of the marine vessel. In a PTO mode, the conventional generator sets of the marine vessel may be stopped and electrical power is supplied by the electrical machine operating as a generator. The rotor of the electrical machine is driven by the propulsion shaft. In a PTI mode, the conventional generator sets are operated if required and additional mechanical propulsion power is supplied to the propulsion shaft by the electrical machine operating as a motor. The rotor of the electrical machine and the main engine drive the propulsion shaft.

A shaft-less rotating electrical machine cannot be transported in its assembled condition—i.e., with its rotor positioned inside the stator—because there is no rotor shaft that can be locked or secured to the stator frame. The rotor and the stator frame are therefore transported separately—i.e., in separate packages. If the rotor is a permanent magnet rotor, its package will normally be a steel crate for example because of the presence of strong magnetic fields. After delivery to the customer, the shaft-less rotating electrical machine must first be assembled by inserting the rotor into the stator (which is a very delicate and time-consuming process when dealing with permanent magnet machines) before the rotor is mechanically connected to the shaftline, e.g., using one or more mechanical fixings such as bolts or screws.

It is desirable to have a shaft-less rotating electrical machine to be transported in its assembled condition, with the rotor stably supported inside the stator and ready for installation to an existing shaftline.

SUMMARY OF THE INVENTION

The present invention provides a support structure used for transportation of a shaft-less rotating electrical machine (e.g., a motor or generator) comprising a stator supported by a stator frame, and a rotor that is mechanically connectable to a shaftline (e.g., using one or more mechanical fixings such as screws or bolts) and is positioned radially inside the stator, the support structure includes one or more supports positionable in an air gap between the stator and the rotor; and one or more transport brackets fixedly connectable between the stator frame and the rotor.

The present invention further provides a shaft-less rotating electrical machine comprising the support structure described above, where the one or more supports are positioned in the air gap and the one or more transport brackets are fixedly connected between the stator frame and the rotor.

As used herein "fixedly connectable" and "fixedly connected" means that the components are firmly or securely connectable or connected (or attachable or attached) to each other in use, e.g., to prevent relative movement between the rotor and the stator in the case of the one or more transport brackets, but it does not necessarily mean that the components are permanently connected or attached. The components may be removably or releasably connectable or connected (or attached) and still be fixedly connected.

The electrical machine may have any suitable construction. The rotor may be a permanent magnet rotor and include a plurality of permanent magnets circumferentially spaced around the rotor. The permanent magnets may be positioned on the surface of the rotor, e.g., using magnet carrier assemblies that are fixed to the rotor surface, or held in position using a sleeve or band. The permanent magnets may be embedded within the rotor.

A plurality of individual supports (or "packers") may be positionable or positioned in the air gap between the rotor and the stator. The supports are normally circumferentially spaced around the air gap. Each support may extend along substantially the whole axial length of the rotor and may be inserted into the air gap from one axial end of the electrical machine, or each support may extend only partly along the axial length of the rotor. In the latter case, a first plurality of supports may be inserted into the air gap from one axial end of the electrical machine and a second plurality of supports may be inserted into the air gap from the other axial end of the electrical machine, so that the rotor is supported at both axial ends. Each support may be made of any suitable non-magnetic material (e.g., a synthetic polymer material) and have any suitable construction. Any suitable number of supports may be used. If each support extends along substantially the whole axial length of the rotor, so that both axial ends of the rotor are supported by each support, it may be that a minimum number of supports is three. In one arrangement, four to seven supports may be used. In one arrangement, eight or more supports may be used.

The one or more supports provide radial support for the rotor and maintain the radial air gap—i.e., they are designed to prevent the radially outer surface of the rotor from contacting the radially inner surface of the stator during transportation and installation to the existing shaftline. The one or more supports are removed from the air gap when they are no longer required. This is normally after the rotor of the electrical machine has been mechanically connected to the shaftline.

The one or more transport brackets provide axial support for the rotor—i.e., they are designed to prevent the rotor from moving relative to the stator and the stator frame in the axial direction. The one or more transport brackets may also prevent the rotor from rotating within the stator.

The support structure may support the rotor inside the stator when the axis of the electrical machine is substantially horizontal—which may be how it is typically transported and orientated for installation—and when the axis is substantially vertical—which is how the electrical machine may be orientated during manufacture or assembly, for example. The support structure may support the rotor during lifting and turning of the electrical machine. Although the support structure is primarily designed to support the rotor during transportation of the electrical machine, it may also provide support in other circumstances, e.g., during manufacture or assembly, or after the electrical machine has been delivered and installed.

One or more transport brackets may be provided at one or both axial ends of the rotor. One or more transport brackets may be fixedly connectable between the stator frame and a first axial end of the rotor and one or more transport brackets may be fixedly connectable between the stator frame and a second axial end of the rotor.

Each transport bracket may have any suitable rigid construction and is adapted to prevent at least axial movement between the rotor and the stator frame. Each transport bracket will typically be constructed to withstand any loads such as acceleration and shock loads that might be expected during transportation so that the rotor remains properly supported at all times. The one or more transport brackets may be removed from the electrical machine after transportation when they are no longer required to support the rotor. However, one or more parts of each transport bracket may remain in place in the electrical machine and may be used subsequently to fix the rotor relative to the stator frame. The one or more parts that are designed to remain in place may be integrally formed as part of the stator frame or rotor, or may be permanently fixed to the stator frame or rotor. The one or more parts that are designed to remain in place may also be removably connectable or connected to the stator frame or rotor, but simply not removed or released after the installation process has been completed. The one or more parts of each transport bracket that are designed to be removed may be removably connectable or connected to the stator frame or rotor, and/or to any other part of each transport bracket such as a fixed part, using one or more mechanical fixings such as bolts, studs or screws, for example. Such parts may be fixedly connectable or connected to the stator frame or rotor, and/or another part of the transport bracket, by inserting and tightening the one or more mechanical fixings and then released or removed by untightening and removing them. Such parts may also be designed to be removably connectable or connected without the need for one or more mechanical fixings—e.g., the parts may be shaped to receive or engage with the stator frame or rotor. During transport of the electrical machine, the one or more parts of each transport bracket typically define a rigid support component that extends between the rotor and the stator frame to prevent relative movement in the axial direction.

In one arrangement, each transport bracket may include at least one first part that is fixedly connectable or connected to the stator frame and at least one second part that is fixedly connectable or connected to the rotor. The at least one first part may be fixedly connectable or connected to the at least one second part, or each transport bracket may include at least one third part that is fixedly connectable or connected between the at least one first part and the at least one second part. Each third part may be removably connectable or connected to the first and/or second parts. For example, this allows one or both of the first and second parts to be permanently fixed to the stator frame and the rotor. More particularly, releasing and removing the third part allows the rotor to move relative to the stator frame even if one or both of the first and second parts are permanently fixed to the stator frame and the rotor. Each third part may extend substantially axially. Each third part may be formed as a tie rod, where optionally at least the ends of the tie rod have an external screw-thread. The external screw-thread may extend along substantially the whole length of the tie rod. In one arrangement, each tie rod may be screwed into an internally screw-threaded opening provided in one of a first part and a second part of each transport bracket and be received through an opening in the other one of the first part and the second part and fixedly connected thereto using one or more mechanical fixings, e.g., nuts.

The at least one first part may be permanently connectable or connected to the stator frame—i.e., it may be designed not to be removed. The at least one first part may extend substantially radially.

The at least one second part may be designed to be removably connectable or connected to the rotor. Each second part may be substantially U-shaped and include a channel that is designed to receive or engage with part of the rotor so that it is removably connectable or connected to the rotor without the need for one or more mechanical fixings. This may make it easier to fit the second part(s) of each transport bracket.

It will be readily understood that several different arrangements of transport bracket are possible. For example, in one arrangement, there may be one first part that is fixedly connectable or connected to the stator frame—e.g., an annular first part that extends around the circumference of the stator frame, or a linear first part that extends diametrically across the axial end of the stator frame—and a plurality of second parts that are fixedly connectable or connected to the rotor. The plurality of second parts may be circumferentially spaced around the rotor. Each second part may be fixedly connectable or connected to the first part by a respective third part—i.e., so that there is a plurality of third parts and where each second part is connected to the same first part. In another arrangement, there may be a plurality of first parts that are fixedly connectable or connected to the stator frame and a plurality of second parts that are fixedly connectable or connected to the rotor. The plurality of first parts may be circumferentially spaced around the stator frame and the plurality of second parts may be circumferentially spaced around the rotor. Each second part may be fixedly connectable or connected to a respective first part by a respective third part—i.e., so that there is a plurality of third parts and where each second part is connected to a separate first part. In this case, there may be a plurality of transport brackets circumferentially spaced apart around the stator frame where each transport bracket includes a first part, a second part and a third part.

The manner in which the one or more transport brackets are constructed may depend on how the rotor is received in the stator during manufacture. For example, if the rotor is inserted radially into the stator frame, e.g., from above, the one or more transport bracket may extend into or across the axial end of the stator frame. But if the rotor is inserted axially into the stator, the one or more transport brackets may have to be designed to allow such axial insertion of the rotor, or to be fixedly connectable or connected to the stator frame after the rotor has been inserted.

The one or more transport brackets may be fixedly connectable or connected to any suitable part of the stator frame—e.g., to its inner cylindrical surface or drum, or to an axial end surface. The stator frame may include one or more mountings for each transport bracket. Each mounting may include one or more internally screw-threaded openings for receiving one or more externally screw-threaded mechanical fixings, e.g., bolts, studs or screws, for fixedly connecting the transport bracket(s) to the stator frame.

The one or more transport brackets may be fixedly connectable or connected to any suitable part of the rotor.

The present invention further provides a method of preparing a shaft-less rotating electrical machine for transport, the shaft-less rotating electrical machine comprising a stator supported by a stator frame, and a rotor that is mechanically connectable to a shaftline and is positioned radially inside the stator, the method includes positioning one or more supports in an air gap between the stator and the rotor; and fixedly connecting one or more transport brackets between the stator and frame and the rotor.

The one or more supports and the one or more transport brackets that provide a support structure for the shaft-less rotating electrical machine during transport may be as described above.

The support structure according to the present invention provides many technical and commercial advantages including significantly reduced transportation costs—by using the support structure the electrical machine may be transported in its assembled condition so the volume to be transported is reduced and there is no need for an additional package to transport the rotor separately; reduced assembly time after transportation—the electrical machine may be transported with its longitudinal axis substantially horizontal thereby avoiding the need to lift and turn the electrical machine, and the rotor does not need to be inserted into the stator frame at the delivery site, instead the customer only needs to position the electrical machine so that the rotor may be mechanically connected to the existing shaftline; and reduced manufacturing time, prior to testing and transportation.

DETAILED DESCRIPTION

Figure 1:
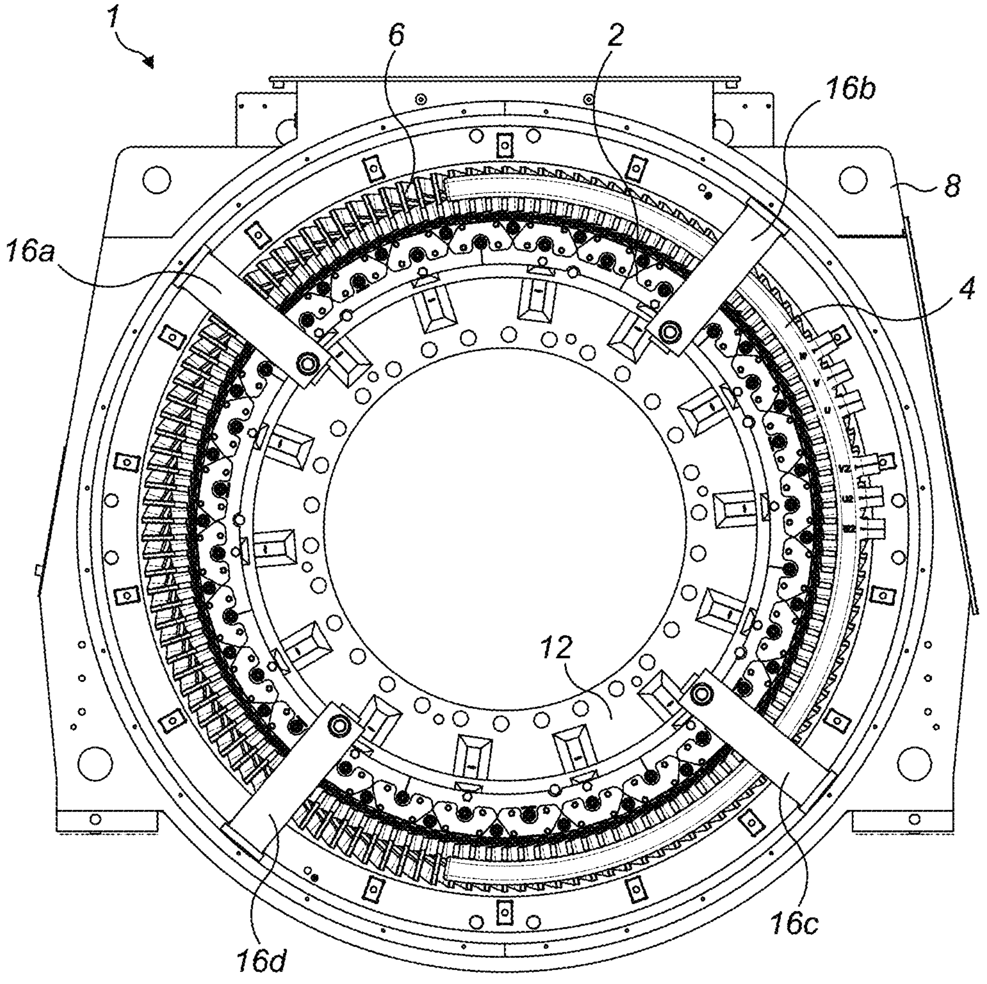
FIG. 1 is an axial end view of an electrical machine including the support structure according to one or more embodiments of the present invention.
Figure 2:
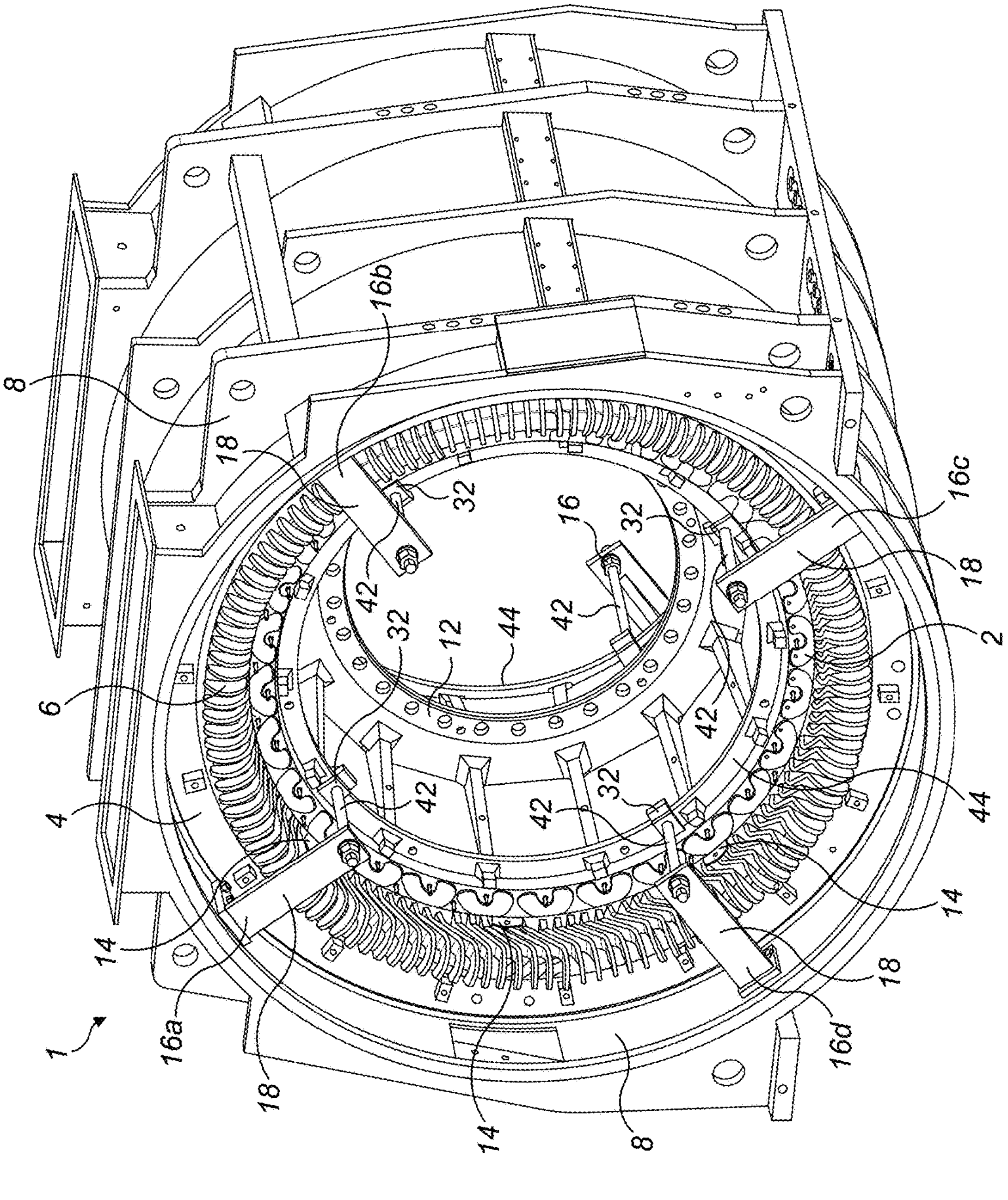
FIG. 2 is a perspective end view of the electrical machine shown in FIG. 1.
Figure 3:
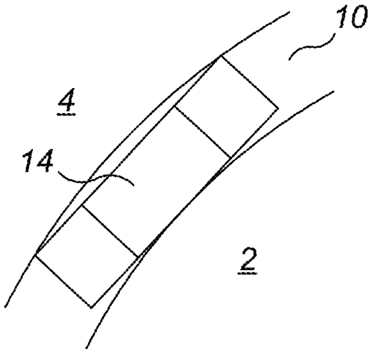
FIG. 3 is a detail view of an air gap packer that forms part of the support structure according to one or more embodiments of the present invention.

Referring to FIGS. 1 to 3, a shaft-less rotating electrical machine 1, e.g., a permanent magnet synchronous machine (PMSM), comprises a rotor 2, a stator 4 with a stator winding 6, and a stator frame 8 that supports the stator.

The rotor 2 and the stator 4 are separated by an annular air gap 10.

The rotor 2 includes a rotor flange 12 that allows the rotor to be mechanically connected to a shaftline (not shown), e.g., the propulsion shaft of a marine vessel.

The electrical machine 1 is shown ready for transportation with the rotor 2 supported within the stator frame 8 by a support structure.

Figure 4:
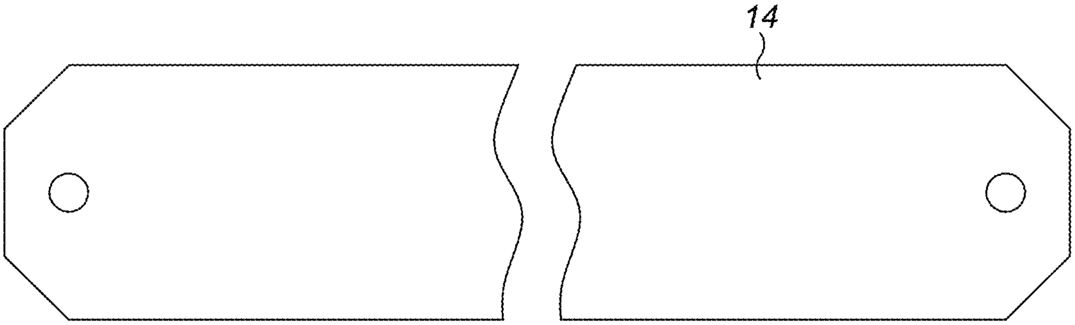
FIG. 4 is a top view of an air gap packer.
Figure 5:
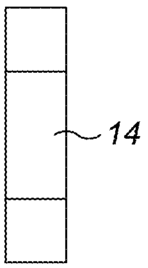
FIG. 5 is an end view of the air gap packer shown in FIG. 4.

The support structure includes a plurality of air gap packers 14 that are positioned in the air gap 10. Although FIGS. 3 and 6 only show a single packer 14 in detail, it will be readily appreciated that the packers are circumferentially spaced around the air gap 10. In one arrangement, eight packers 14 may be used and they are equally spaced around the rotor 2. Each packer 14 extends along substantially the whole axial length of the rotor 2 and may be inserted into the air gap 10 from one axial end of the electrical machine 1. Each packer 14 is typically a few millimetres thick (e.g., about 2 to 6 mm) and may be made of a suitable non-magnetic material such as a synthetic polymer like Nylatron GS, which includes the addition of molybdenum disulphide to a nylon base. Nylatron GS has excellent mechanical strength, stiffness, hardness, good sliding properties, wear resistance and machinability. The packers 14 provide radial support for the rotor 2 and maintain the radial air gap—i.e., they are designed to prevent the radially outer surface of the rotor 2 from contacting the radially inner surface of the stator 4 during transportation. A single packer 14 is shown in more detail and separately from the rest of the electrical machine in FIGS. 4 and 5.

Figure 6:
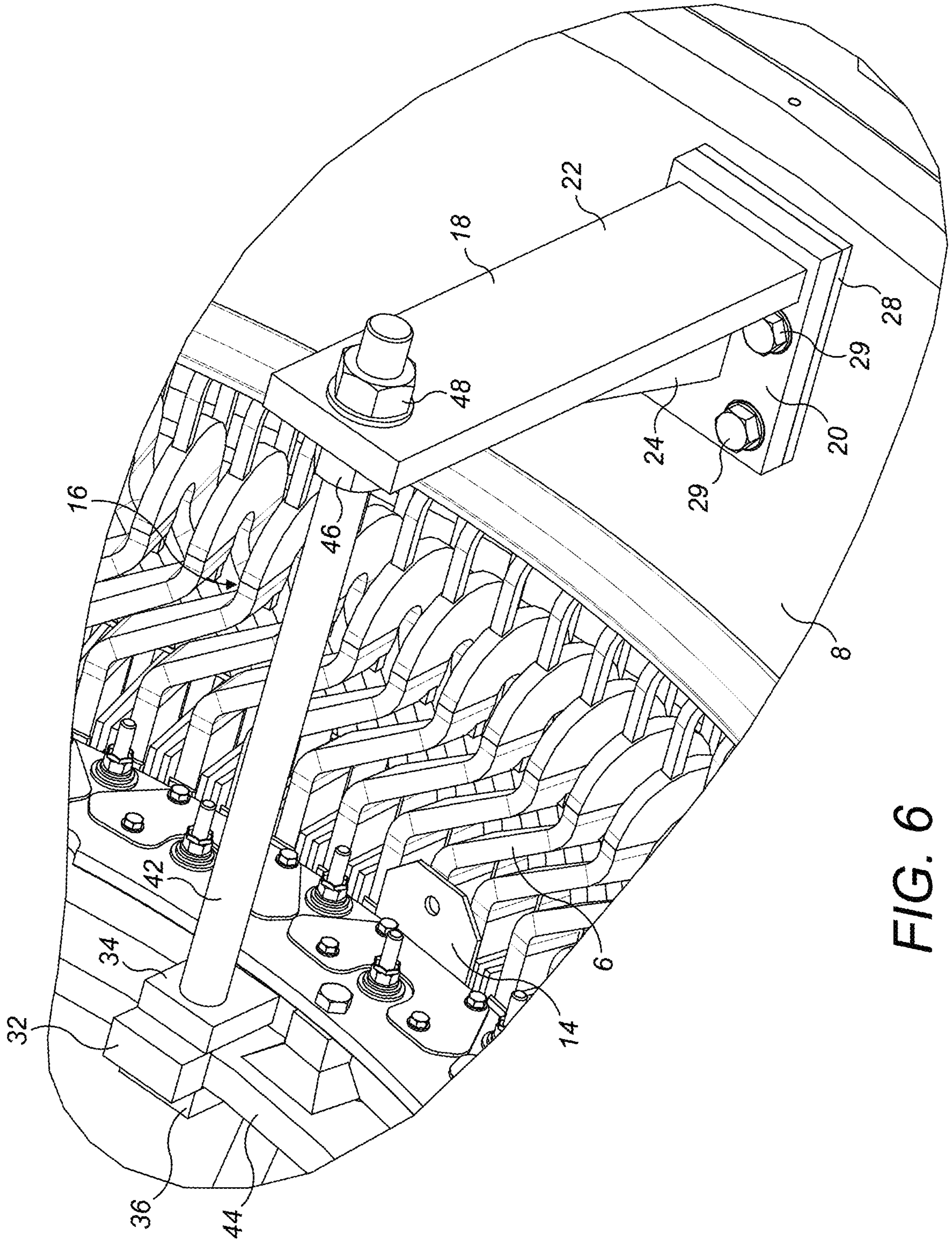
FIG. 6 is a perspective view of a transport bracket that forms part of the support structure according to one or more embodiments of the present invention.
Figure 7:
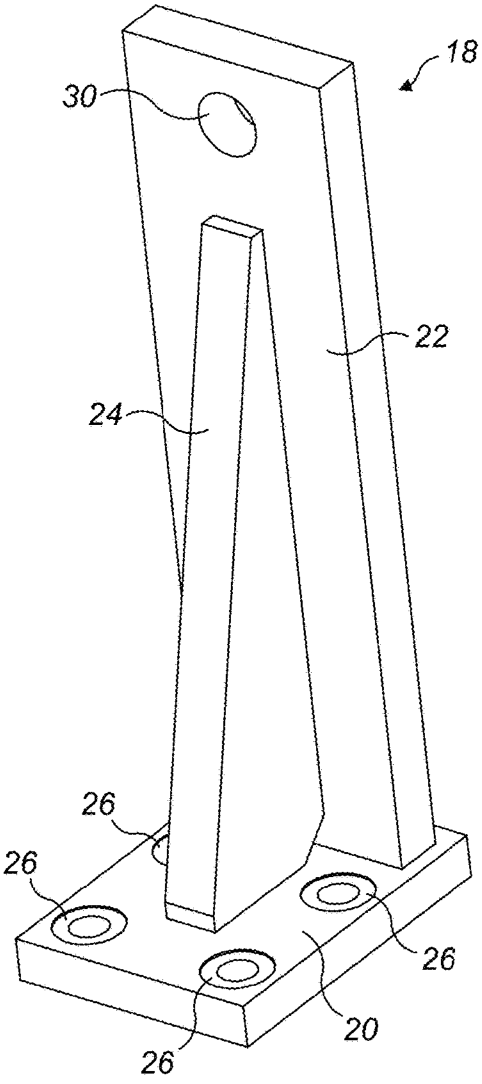
FIG. 7 is a rear perspective view of a first part of the transport bracket shown in FIG. 6.
Figure 8:
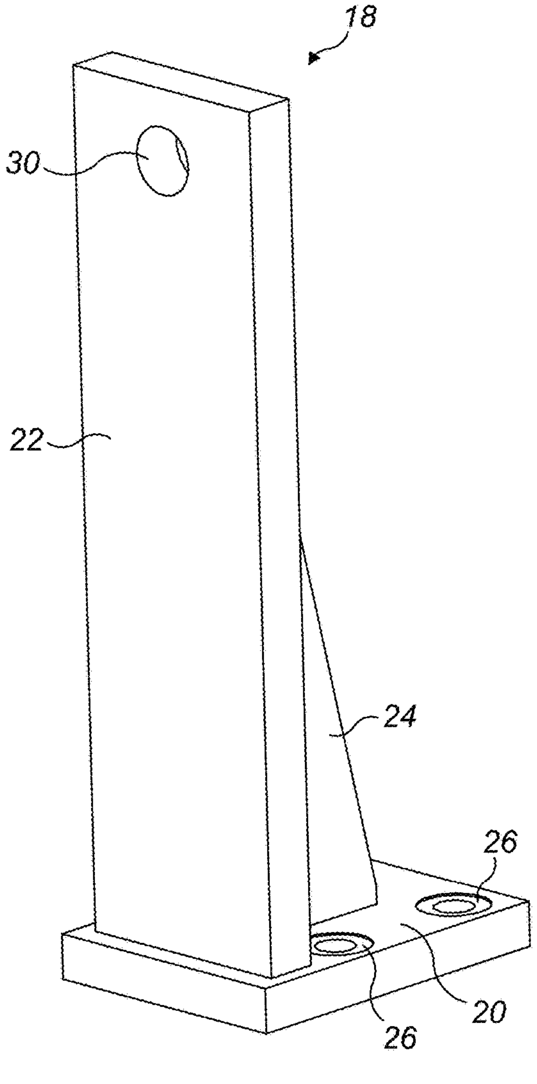
FIG. 8 is a front perspective view of the first part shown in FIG. 7.
Figure 9:
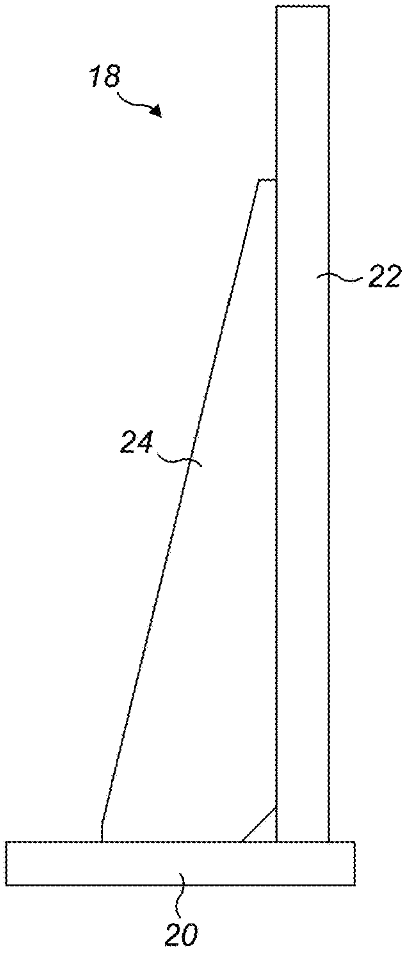
FIG. 9 is a side view of the first part shown in FIG. 7.
Figure 10:
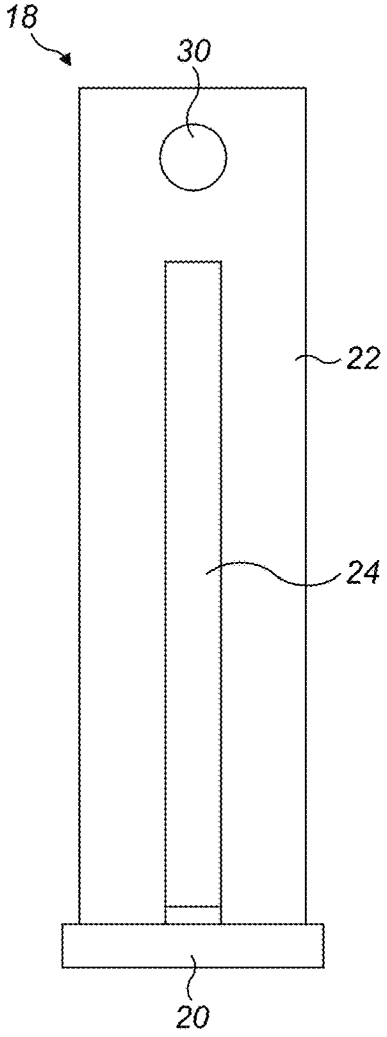
FIG. 10 is a rear view of the first part shown in FIG. 7.
Figure 11:
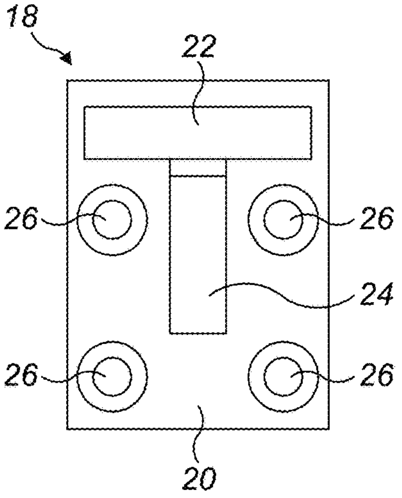
FIG. 11 is top view of the first part shown in FIG. 7.
Figure 12:
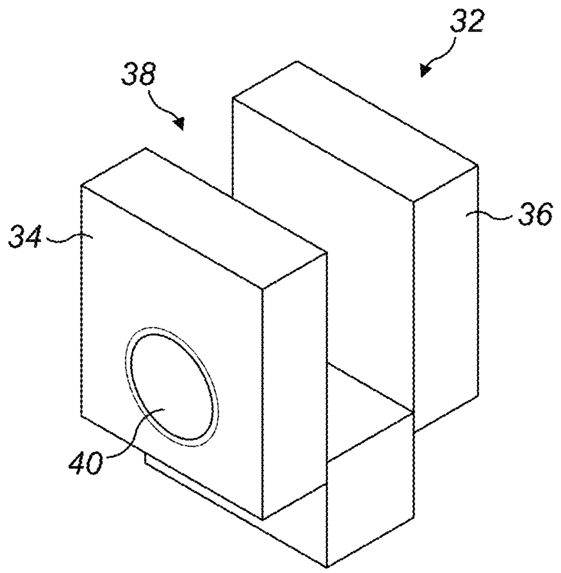
FIG. 12 is a perspective view of second part of the transport bracket shown in FIG. 6.
Figure 13:
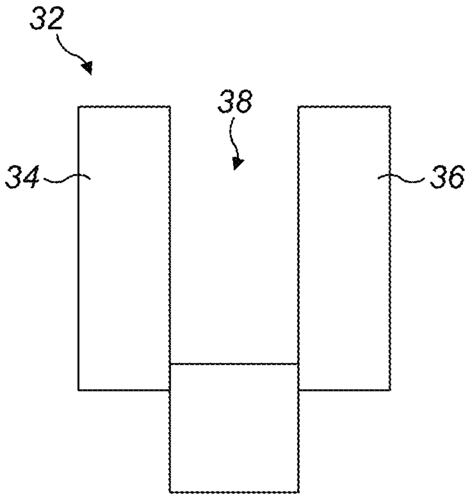
FIG. 13 is a side view of the second part shown in FIG. 12.
Figure 14:
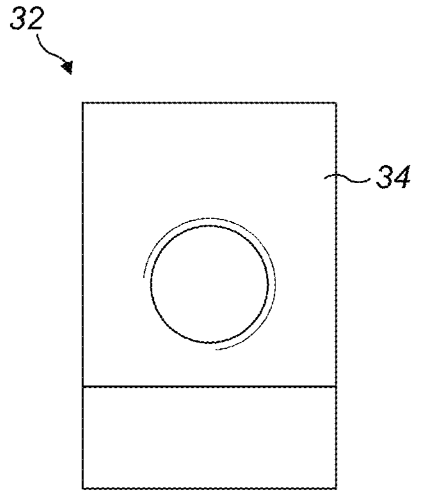
FIG. 14 is an end view of the second part shown in FIG. 12.

Referring to FIGS. 1, 2 and 6, the support structure also includes a plurality of transport brackets 16 that provide axial support for the rotor 2—i.e., they are designed to prevent the rotor from moving relative to the stator 4 and the supporting stator frame 8 in the axial direction.

In one arrangement, four transport brackets 16*a*, 16*b*, . . . , 16*d* are provided at a first axial end of the stator frame 8. Another four transport brackets are similarly provided at a second axial end of the stator frame 8 and one of them can be seen in FIG. 2. The transport brackets 16 are circumferentially spaced around each axial end of the stator frame 8 as shown.

Referring to FIGS. 6 to 11, each transport bracket 16 includes a first part 18 made of mild steel plate having a general L-shape with a base plate 20 and a support plate 22. The base plate 20 and the support plate 22 are arranged substantially perpendicular to each other. A triangular-shaped reinforcing rib 24 extends between the base plate 20 and the support plate 22. The base plate 20 includes four openings 26 for receiving externally screw-threaded bolts 29. The base plate 20 of each transport bracket 16 is positioned on a mounting 28 formed on the inner cylindrical surface of the stator frame 8. Each mounting 28 includes four internally screw-threaded openings. Each transport bracket 16 is therefore fixedly connected to the stator frame 8 by inserting the bolts 29 through the openings 26 in the base plate 20 and screwing them into the aligned internally screw-threaded openings in the corresponding mounting 28.

The distal part of each support plate 22 includes an opening 30.

As shown in FIG. 6, the support plate 22 of each transport bracket 16 extends radially inwardly when mounted to the stator frame 8 and passes over the air gap 10. The first part 18 of each transport bracket 16 is fixedly connected to the stator frame 8 after the rotor 2 has been inserted axially into the stator 4 during the assembly process. The first part 18 of each transport bracket 16 is designed to be permanently fixed to the stator frame 8.

Referring to FIGS. 6 and 12 to 14, each transport bracket 16 includes a second part 32 made of mild steel plate having a general U-shape with a pair of flanges 34, 36 that define a channel 38 therebetween. The flange 34 includes an internally screw-threaded opening 40.

Figure 15:
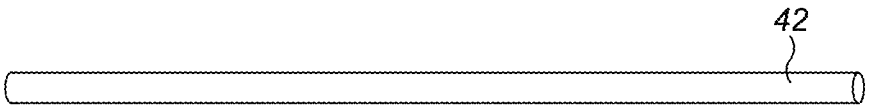
FIG. 15 is a side view of a third part of the transport bracket shown in FIG. 6.

Referring to FIGS. 6 and 15, each transport bracket 16 includes a third part 42 (or an externally screw-threaded tie rod) made of mild steel.

To fit each transport bracket 16, the second part 32 is fitted over part of an annular rib 44 of the rotor 2. In particular, the second part 32 is fitted over the annular rib 44 so that the rib is received in the channel 38 between the flanges 34, 36 and with the flange 34 facing towards the corresponding first part 18 of the transport bracket 16. When the second part 32 is properly fitted, the openings 30, 40 in the first and second parts are substantially axially aligned. From the adjacent axial end of the stator frame 8, a first end of the third part 42 is passed through the opening 30 in the first part 18 towards the second part 32. The first end of the third part 42 is screwed into a first nut 46 and then into the internally screw-threaded opening 40 in the flange 34 of the second part 32. A second nut 48 is screwed onto a second, opposite, end of the third part 42 that extends outwardly from the support plate 22 as shown most clearly in FIG. 6. The first and second nuts 46, 48 are tightened against the facing surfaces of the support plate 22 of the first part 18.

This fitting process is repeated for all eight transport brackets 16. When all the transport brackets 16 have been fitted, the rotor 2 is securely positioned inside the stator 4 and cannot move relative to the stator frame 8 in the axial direction.

To properly install the transport brackets 16, it may be necessary to first rotate the rotor 2 relative to the stator frame 8 so that the second parts 32 may be properly fitted over the annular rib 44—i.e., so that they are not obstructed by the axial ribs of the rotor 2. One such axial rib is shown immediately next to the transport bracket 16 in FIG. 6, for example.

With the supports 14 and the transport brackets 16 properly installed to provide radial and axial support for the rotor 2, the electrical machine 1 may be transported to a customer in a suitable package, e.g., a container or crate.

When the electrical machine 1 has been delivered to the customer, the third part 42 of each transport bracket 16 may be released from the first part 18 by untightening the first and second nuts 46, 48. When there is sufficient clearance between the first nut 46 and the support plate 22, the first end of the third part 42 may be unscrewed from the second part 32 of each transport bracket 16 and the second part 32 may then be removed from the annular rib 44 of the rotor 2. The nut 46 is fully unscrewed from the third part 42 so that the third part may be released from the first part 18—i.e., by removing the third part through the opening 30 in the support plate 22. As mentioned above, the first part 18 of each transport bracket 16 may remain fixedly connected to the stator frame 4. The rotor 2 may therefore be supported or secured in the future by refitting and reconnecting the second and third parts 32, 42 of the transport brackets 16 and/or reinserting the supports 14 into the air gap 10.

After the rotor flange 12 has been mechanically connected to the existing shaftline, e.g., the propulsion shaft of a marine vessel, and alignment has been carried out, the packers 14 may be removed from the air gap 10. This is because the rotor 2 is then properly supported by the shaftline and will not move radially towards the stator 4. Any parts of the transport brackets 16 that are be designed to remain fixed to the stator frame 4 will not impede the shaftline connection.

Although the support structure shown in FIGS. 1 and 2 has four transport brackets 16 at each axial end of the stator frame 8, it will be readily understood that transport brackets may optionally be provided at only one axial end of the stator frame. Any suitable number of transport brackets may be provided—with a single transport bracket at one axial end of the stator frame being an absolute minimum. Preferably, the rotor 2 will be axially supported by one or more transport brackets at a plurality of locations around its circumference.

Figure 16:
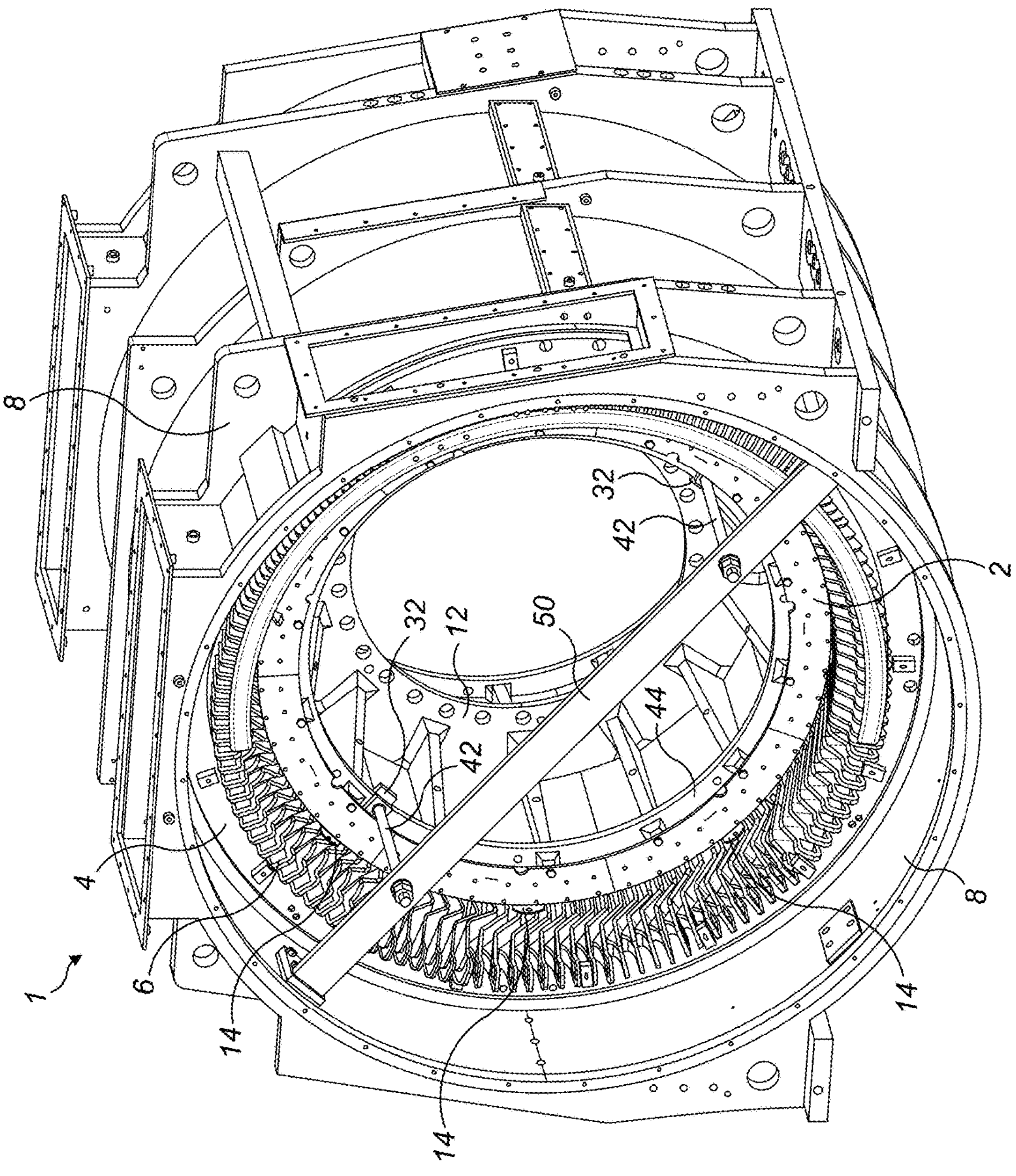
FIG. 16 is a perspective end view of an electrical machine including an alternative support structure according to the present invention.
Figure 17:
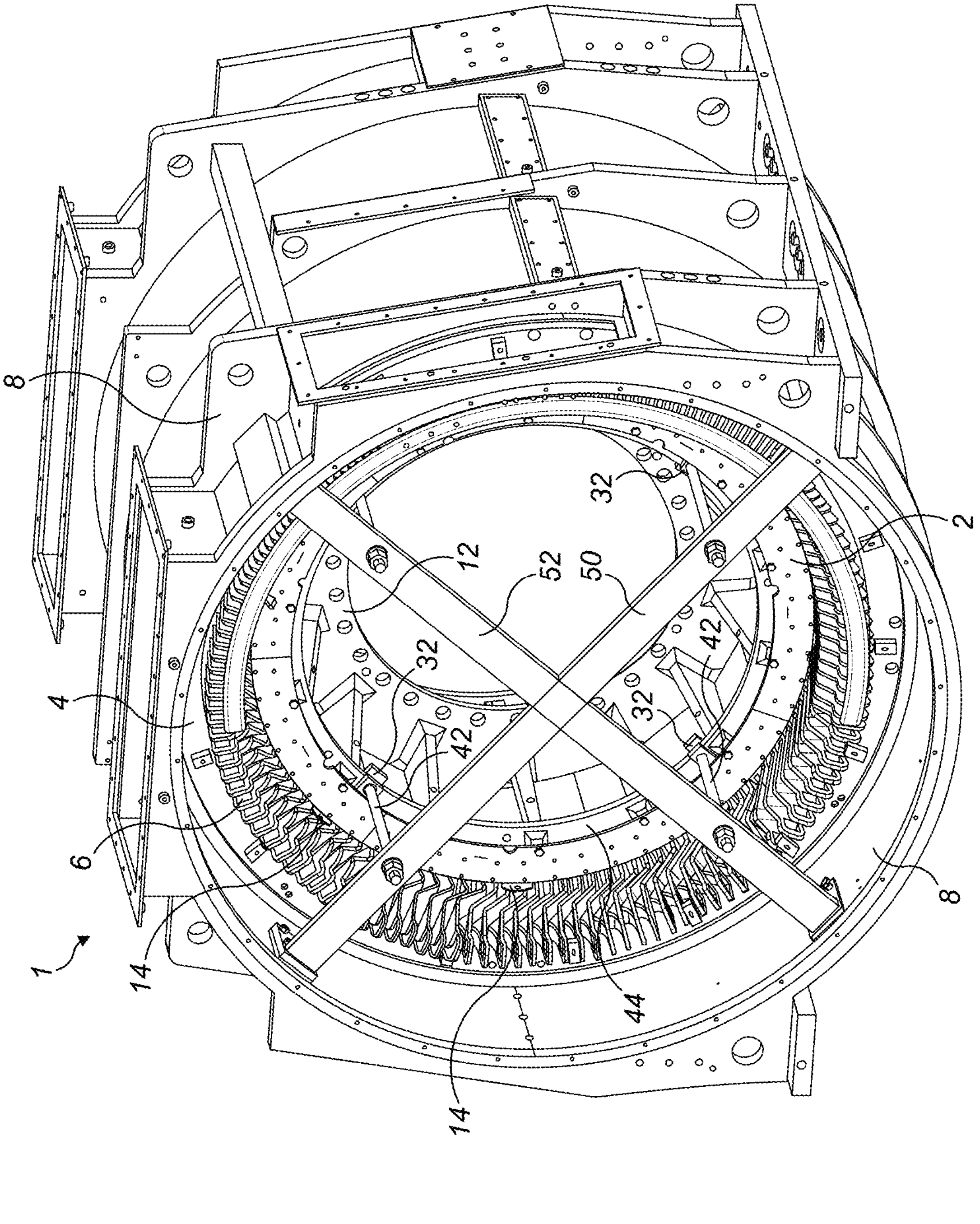
FIG. 17 is a perspective end view of an electrical machine including an alternative support structure according to the present invention.
Figure 18:
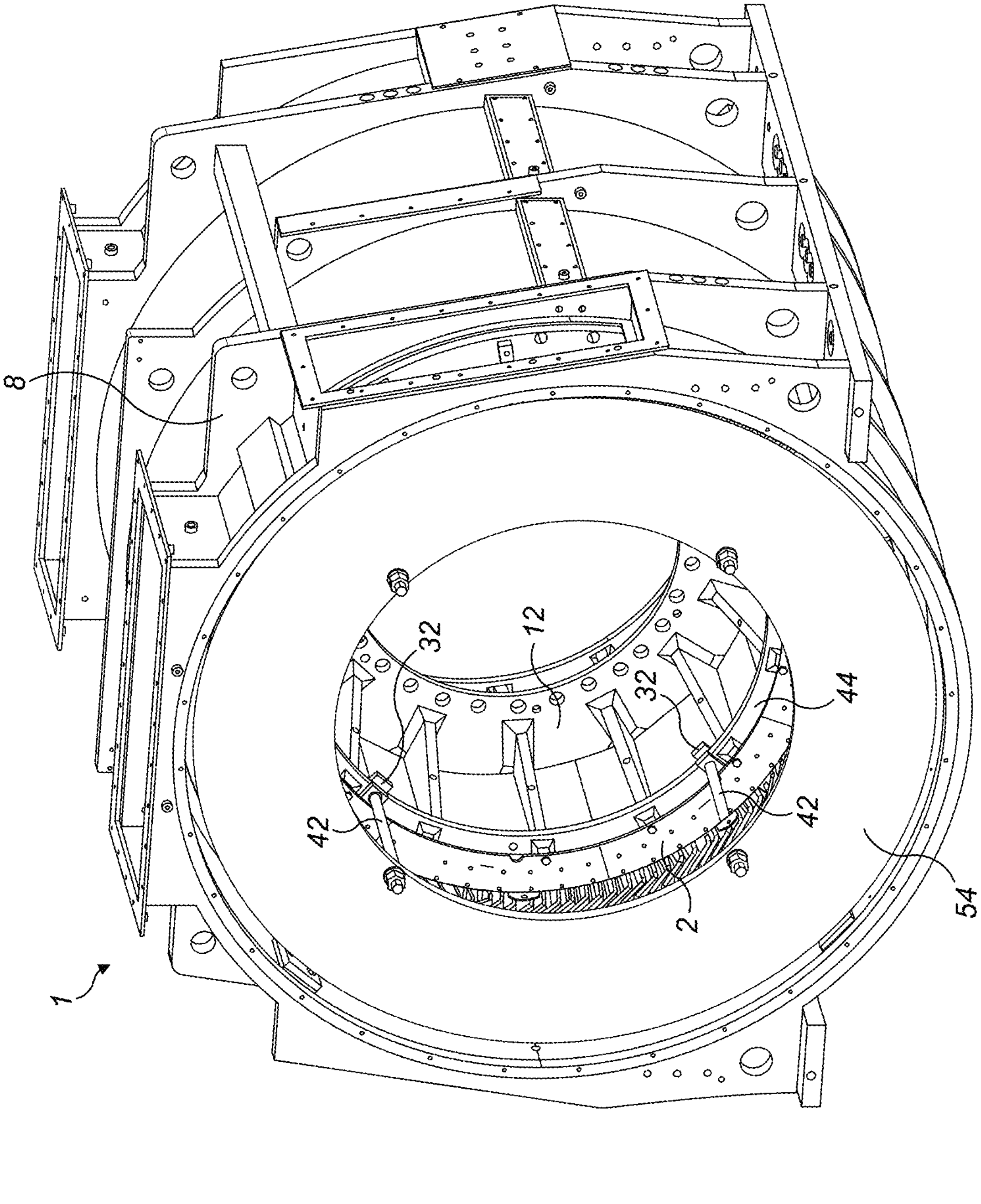
FIG. 18 is a perspective end view of an electrical machine including an alternative support structure according to the present invention.

FIGS. 16 to 18 show some alternative arrangements. In particular, FIG. 16 shows an arrangement with a single linear first part 50 at one axial end of the stator frame 8. The first part 50 extends diametrically across the stator frame 8 and is fixedly connected to the stator frame at its ends. Two second parts 32 are fixedly connected to the first part 50 as described above, i.e., by a respective third part 42. In particular, the first part 50 includes two openings, where each opening receives an end of a respective third part 42. The openings in the first part 50 correspond to the openings 30 in the support plates 22 of the transport brackets 16 described above. The other end of each third part 42 is screwed into a respective second part 32 that is fitted on an annular rib 44 of the rotor as shown 2. This arrangement may be described as a single transport bracket with one first part 50 and two second and third parts 32, 42.

FIG. 17 shows an arrangement with two linear first parts 50, 52 at one axial end of the stator frame 8. Each first part 50, 52 extends diametrically across the stator frame 8 and is fixedly connected to the stator frame at its ends. The first parts 50, 52 may be fixedly connected together where they overlap or cross. Four second parts 32 are fixedly connected to the first parts 50, 52 as described above, i.e., by a respective third part 42. In particular, the first part 50 includes two openings and the second part 52 includes two openings, where each opening receives an end of a respective third part 42. The openings in the first and second parts 50, 52 correspond to the openings 30 in the support plates 22 of the transport brackets 16 described above. The other end of each third part 42 is screwed into a respective second part 32 that is fitted on an annular rib 44 of the rotor 2 as shown. This arrangement may be described as a single transport bracket with two first parts and four second and third parts 32, 42.

FIG. 18 shows an arrangement with a single annular first part 54 at one axial end of the stator frame 8. The first part 54 is fixedly connected to the stator frame 8 at a plurality of mounting locations around its circumference. Four second parts 32 are fixedly connected to the first part 54 as described above, i.e., by a respective third part 42. In particular, the first part 54 includes four openings that are circumferentially spaced around the stator frame 8, where each opening receives an end of a respective third part 42. The openings in the first part 54 correspond to the openings 30 in the support plates 22 of the transport brackets 16 described above. The other end of each third part 42 is screwed into a respective second part 32 that is fitted on an annular rib 44 of the rotor 2 as shown. This arrangement may be described as a single transport bracket with one first part and four second and third parts 32, 42.

The invention claimed is:

1. A support structure used for transportation of a shaft-less rotating electrical machine comprising a stator supported by a stator frame, and a rotor that is positioned radially inside the stator, the support structure comprising:

one or more supports (i) having an entire structure positioned within an air gap between the stator and the rotor and (ii) extending along an entire axial length of the rotor, the one or more supports being configured to provide radial support for the rotor; and one or more transport brackets extending over the air gap and are fixedly connectable between the stator frame and the rotor to prevent axial movement of the rotor relative to the stator frame.

2. The support structure according to claim 1, wherein the one or more supports are within the air gap at circumferentially spaced intervals.

3. The support structure according to claim 1, wherein each support is made of a non-magnetic material.

4. The support structure according to claim 1, wherein the one or more transport brackets are fixedly connectable between the stator frame and a first axial end of the rotor and one or more transport brackets fixedly connectable between the stator frame and a second axial end of the rotor.

5. The support structure according to claim 1, wherein the one or more transport bracket includes at least one first part that is fixedly connectable to the stator frame and at least one second part that is fixedly connectable to the rotor.

6. The support structure according to claim 5, wherein the one or more transport bracket includes at least one third part that is fixedly connected to the at least one first part and the at least one second part.

7. The support structure according to claim 6, wherein the at least one third part is removably connected to the at least one first part and the at least one second part.

8. The support structure according to claim 6, wherein the at least one third part extends substantially axially between the at least one first part and the at least one second part.

9. The support structure according to claim 6, where a first end of the at least one third part is screwed into an internally screw-threaded opening provided in one of the at least one first part and the at least one second part and is received through an opening in the other one of the at least one first part and the at least one second part and fixedly connected thereto with one or more mechanical fixings.

10. The support structure according to claim 5, wherein the at least one first part is adapted to be permanently connectable to the stator frame.

11. The support structure according to claim 5, wherein the at least second part is adapted to be removably connectable to the rotor.

12. The support structure according to claim 5, wherein the at least one second part is substantially U-shaped and includes a channel that is adapted to receive or engage with an annular rib of the rotor.

13. A shaft-less rotating electrical machine comprising:

a stator supported by a stator frame;

a rotor that is positioned radially inside the stator; and the support structure according to claim 1;

wherein the one or more supports are positioned in the air gap between the stator and the rotor to provide radial support for the rotor and the one or more transport brackets are fixedly connected between the stator frame and the rotor and extend over the air gap to prevent axial movement of the rotor relative to the stator frame.

14. The shaft-less rotating electrical machine according to claim 13, wherein the rotor is a permanent magnet rotor.

15. A method of preparing a shaft-less rotating electrical machine for transport, the shaft-less rotating electrical machine comprising a stator supported by a stator frame, and a rotor that is positioned radially inside the stator, the method comprising:

positioning one or more supports in an air gap between the stator and the rotor, the one or more supports (i) having an entire structure positioned within the air gap and (ii) extending along an entire axial length of the rotor, the one or more supports providing radial support for the rotor; and fixedly connecting one or more transport brackets between the stator frame and the rotor, the one or more transport brackets extending over the air gap to prevent axial movement of the rotor relative to the stator frame.

* * * * *